United States Patent
Maalouf et al.

(10) Patent No.: US 10,954,832 B2
(45) Date of Patent: Mar. 23, 2021

(54) SYSTEM FOR COOLING A CIRCUIT OF A FIRST FLUID OF A TURBOMACHINE

(71) Applicants: SAFRAN, Paris (FR); COMMISSARIAT A L'ENERGIE ATOMIQUE ET AUX ENERGIES ALTERNATIVES, Paris (FR)

(72) Inventors: Samer Maalouf, Moissy-Cramayel (FR); Nawal Jaljal, Moissy-Cramayel (FR); Pierre Dumoulin, Chevremont (FR); Nicolas Tauveron, Grenoble (FR)

(73) Assignees: SAFRAN, Paris (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 103 days.

(21) Appl. No.: 16/335,936

(22) PCT Filed: Sep. 22, 2017

(86) PCT No.: PCT/FR2017/052555
§ 371 (c)(1),
(2) Date: Mar. 22, 2019

(87) PCT Pub. No.: WO2018/055307
PCT Pub. Date: Mar. 29, 2018

(65) Prior Publication Data
US 2019/0309665 A1    Oct. 10, 2019

(30) Foreign Application Priority Data
Sep. 23, 2016 (FR) ...................................... 16 58961

(51) Int. Cl.
*F01M 5/00* (2006.01)
*F02C 7/06* (2006.01)
(Continued)

(52) U.S. Cl.
CPC ............... *F01M 5/002* (2013.01); *F02C 7/06* (2013.01); *F02C 7/16* (2013.01); *F02C 7/185* (2013.01);
(Continued)

(58) Field of Classification Search
CPC . F01M 5/002; F02C 7/185; F02C 7/16; F02C 7/06; F02C 7/14; F02C 7/224;
(Continued)

(56) References Cited

U.S. PATENT DOCUMENTS 5,351,487 A * 10/1994 Abdelmalek ............. F02G 5/00
                                                         60/618
5,615,547 A *  4/1997 Beutin ....................... F02C 7/14
                                                       60/39.08

(Continued)

FOREIGN PATENT DOCUMENTS

| WO | WO 2010/051011 A1 | 5/2010 |
| WO | WO 2014/013170 A1 | 1/2014 |
| WO | WO 2015/122949 A2 | 8/2015 |

OTHER PUBLICATIONS

International Search Report dated Jan. 3, 2018 in PCT/FR2017/052555 filed Sep. 22, 2017.

*Primary Examiner* — Joseph J Dallo
*Assistant Examiner* — Kurt Philip Liethen
(74) *Attorney, Agent, or Firm* — Oblon, McClelland, Maier & Neustadt, L.L.P.

(57) ABSTRACT

A cooling system for cooling a circuit of a first fluid of a turbomachine, the cooling system including a refrigerant fluid circuit including a first heat exchanger for exchanging heat between the refrigerant fluid and air, a second heat exchanger for exchanging heat between the refrigerant fluid and the first fluid, an expander located downstream from the first heat exchanger and upstream from the second heat exchanger in the flow direction of the refrigerant fluid, and (Continued)

a compressor located downstream from the second heat exchanger and upstream from the first heat exchanger; the cooling system further includes a third heat exchanger of the first fluid and air type.

9 Claims, 1 Drawing Sheet

(51) Int. Cl.
    *F02C 7/18* (2006.01)
    *F02C 7/16* (2006.01)
    *F16N 39/02* (2006.01)
    *F02C 7/14* (2006.01)
    *F02C 7/224* (2006.01)
    *F02C 9/18* (2006.01)

(52) U.S. Cl.
    CPC ............... *F16N 39/02* (2013.01); *F02C 7/14* (2013.01); *F02C 7/224* (2013.01); *F02C 9/18* (2013.01); *F05D 2210/14* (2013.01); *F05D 2260/213* (2013.01); *F05D 2260/98* (2013.01); *Y02T 50/60* (2013.01)

(58) Field of Classification Search
    CPC . F02C 9/18; F16N 39/02; Y02T 50/60; F05D 2210/14; F05D 2260/98; F05D 2260/213
    See application file for complete search history.

(56) References Cited

U.S. PATENT DOCUMENTS

| | | | |
|---|---|---|---|
| 6,182,435 | B1* | 2/2001 | Niggemann ............ B64D 13/00 60/772 |
| 6,948,331 | B1 | 9/2005 | Ho et al. |
| 7,287,368 | B2* | 10/2007 | Tumelty .................. F01D 25/20 184/6.11 |
| 10,082,078 | B2* | 9/2018 | Snape ....................... F02C 7/14 |
| 2010/0107603 | A1 | 5/2010 | Smith |
| 2011/0252764 | A1 | 10/2011 | Smith |
| 2015/0192033 | A1 | 7/2015 | Garassino et al. |
| 2016/0312703 | A1 | 10/2016 | Ribarov et al. |
| 2017/0370291 | A1* | 12/2017 | Rambo ................... F02C 7/232 |

* cited by examiner

SYSTEM FOR COOLING A CIRCUIT OF A FIRST FLUID OF A TURBOMACHINE

FIELD OF THE INVENTION

The present invention relates to the general field of dissipating heat power generated in a turbomachine. It relates in particular to cooling a fluid contained in a circuit, such as an oil circuit, in an airplane turbomachine.

STATE OF THE ART

In known manner, a turbomachine includes an oil circuit for lubricating and/or cooling equipment, such as in particular rolling bearings or gear members.

The oil flowing in the oil circuit of the engine is typically cooled by air and oil type heat exchangers, also known as air cooled oil coolers (ACOCs).

These heat exchangers operate by means of a stream of air that is usually drawn from the flow passage of the secondary stream through the turbomachine and that is guided along a circuit for exchanging heat with the oil circuit. Such heat exchangers may be of the "surface" type, where they are in the form of a metal surface piece allowing oil to circulate into channels machined at its center. Heat is then extracted by means of fins in contact with the drawn stream of air. In order to ensure significant amounts of heat exchange, such a heat exchanger needs to present a large area, and it therefore presents weight and size that are large. Alternatively, air and oil type heat exchangers may be of the "brick" type. Unfortunately, such heat exchangers are relatively heavy and they have the disadvantage of disturbing the air stream. This disturbance has the effect of increasing the aerodynamic drag of the turbomachine and consequently of increasing the energy consumption of the turbomachine; it therefore penalizes the overall efficiency of the turbomachine (i.e. there is an increase in its specific fuel consumption (SFC)).

Whatever the technology used for air and oil heat exchangers, they therefore give rise to head losses in the flow passage for the secondary stream from which the air is drawn, thereby reducing the efficiency of the turbomachine with an increase in its specific fuel consumption (SFC). In addition, future turbomachine architectures having an ultra-high bypass ratio (UHBR) may incorporate a gearbox(es) that needs to be cooled by oil, thereby leading to greater requirements for cooling the oil in the oil circuit of the turbomachine.

In order to overcome the drawbacks of air and oil type heat exchangers, document WO 2014/013170 proposes replacing the air and oil heat exchanger of the system for cooling the oil of the oil circuit with a thermodynamic device of the heat pump type. The advantage of such a device is that it enables the surface area of the heat exchangers to be reduced (and thus enables the head losses induced by those heat exchangers to be reduced and also enables the disturbing effects on the air stream to be reduced) by increasing the temperature difference between the hot source (specifically the oil in the oil circuit of the turbomachine) and the cold source (specifically air, e.g. coming from the flow passage for the secondary stream through the turbomachine). Specifically, with such a thermodynamic device, it is possible to raise the refrigerant fluid used to temperatures that are much higher than the temperature of the oil so as to obtain a temperature difference relative to the air that may be well above 50° C., thereby increasing the effectiveness of the cooling system and enabling its size to be limited so as to reduce the impact of the cooling system on the overall performance of the turbomachine and thus on its fuel consumption.

In conventional manner, the term "refrigerant fluid" is used to mean a working fluid in a refrigeration cycle for enhancing the exchange of heat between two sources; the refrigerant fluid may be pure or it may be a mixture of pure fluids, such as acetone, ethanol, n-pentane, . . . .

The gains obtained by such a thermodynamic device in terms of reducing the head losses induced by the heat exchangers are nevertheless offset by the cost of the energy associated with supplying the power needed to operate the compressor of the thermodynamic device, and by the cost of the energy associated with the weight added by the various components of the heat pump.

SUMMARY OF THE INVENTION

An object of the present invention is thus to propose a cooling system that does not present such drawbacks.

According to the invention, this object is achieved by a cooling system for cooling a circuit of a first fluid of a turbomachine, the cooling system including a refrigerant fluid circuit comprising:
  a first heat exchanger configured to exchange heat between the refrigerant fluid and air;
  a second heat exchanger configured to exchange heat between the refrigerant fluid and the first fluid;
  an expander located downstream from the first heat exchanger and upstream from the second heat exchanger in the flow direction of the refrigerant fluid; and
  a compressor located downstream from the second heat exchanger and upstream from the first heat exchanger.

The cooling system further comprises a third heat exchanger of the first fluid and air type.

In conventional manner, the term "heat exchanger" is used herein to mean a device configured to enable heat to be transferred from a first fluid to a second fluid; thus the first heat exchanger is configured to transfer heat from the refrigerant fluid to air, while the second heat exchanger is configured to transfer heat from the first fluid to the refrigerant fluid, and the third heat exchanger is configured to transfer heat from the first fluid to air.

The present invention is not limited to the situation in which the refrigerant fluid is in a thermodynamic state below its critical point, and it also covers embodiments in which the exchanges of heat performed by one and/or the other of the first and second heat exchangers are not accompanied by a change of phase of the refrigerant fluid, when the refrigerant fluid is in a thermodynamic state above its critical point.

When heat is exchanged between the refrigerant fluid and air at a pressure that is lower than or equal to the critical pressure of the refrigerant fluid, the first heat exchanger forms a condenser. Alternatively, if heat is exchanged at a pressure higher than the critical pressure, then the first heat exchanger forms a cooler.

When heat is exchanged between the refrigerant fluid and the first fluid at a pressure lower than or equal to the critical pressure of the refrigerant fluid, the second heat exchanger forms an evaporator. Alternatively, if heat is exchanged at a pressure higher than the critical pressure, the second heat exchanger forms a heater.

Naturally, the present invention is not limited to an embodiment in which the heat exchanges performed by the first and second heat exchangers are performed at a pressure lower than or equal to the critical pressure (subcritical cycle); the invention also covers the situation of a transcritical cycle of the refrigerant fluid, in which the exchange of heat by the second heat exchanger takes place at a pressure lower than or equal to the critical pressure, while the exchange of heat by the first heat exchanger takes place at a pressure higher than the critical pressure of the refrigerant fluid, and also the situation of a supercritical cycle for the refrigerant fluid in which the exchanges of heat performed by the first and second heat exchangers are both at a pressure higher than the critical pressure.

The cooling system of the present invention, which comprises a passive cooling system, constituted by the third heat exchanger, and an active cooling system, constituted by the refrigerant fluid circuit, is remarkable in that it is adapted to cooling needs that are different. Thus, when cooling needs are relatively small, only the third heat exchanger is used for cooling the first fluid of the circuit, but when cooling needs are larger, the third heat exchanger is used in combination with the refrigerant fluid circuit in order to cool the first fluid.

The refrigerant fluid circuit can thus be smaller in size than a system for cooling the first fluid circuit and comprising only the refrigerant fluid circuit, thereby reducing the impact of the weight added by the various components of the refrigerant fluid circuit.

In addition, during stages in which only the third heat exchanger is used for cooling the first fluid, the cost associated with supplying the power needed to operate the compressor of the refrigerant fluid circuit is significantly reduced.

Furthermore, the length of time the refrigerant fluid circuit is used may be shortened, thereby reducing any risk of malfunction associated with wear.

Furthermore, the possibility of using the refrigerant fluid circuit in combination with the third heat exchanger serves to reduce the severity of a situation in which the user discovers that one of the elements of the refrigerant fluid circuit is not operating.

The heat pump constituted by the refrigerant fluid circuit is thus integrated in the cooling system in such a manner that the improvement delivered in terms of performance by the presence of the refrigerant fluid circuit compensates or even exceeds the cost inherent to adding the components of said circuit, and the drawbacks associated with such added components.

By way of example and in non-limiting manner, the third heat exchanger may be of the "surface" type or of the "brick" type.

The invention is set out below in a series of embodiments, which may be considered singly or in combination with one or more preceding embodiments.

In some embodiments, the third heat exchanger is located downstream from the refrigerant fluid circuit in the flow direction of the first fluid.

Generally, the temperature difference between the first fluid and air is greater than the temperature difference between the refrigerant fluid and the first fluid; exchanges of heat between air and the first fluid are thus optimized by causing the first fluid to pass initially through the refrigerant fluid circuit and more particularly through the second heat exchanger of said refrigerant fluid circuit, and then causing the first fluid to pass through the third heat exchanger.

In some embodiments, the cooling system also includes a heat exchanger of the fuel and first fluid type (known as a "fuel cooled oil cooler (FCOC)); in known manner, such heat exchangers perform two functions, namely both heating the fuel prior to injecting it into the combustion chamber and also cooling the first fluid, which is heated by heat dissipated from the engine.

In some embodiments, the cooling system further comprises actuator means configured to interrupt the operation of the refrigerant fluid circuit.

By this provision, the cooling system can pass easily from a first mode of operation in which the first fluid passes in succession through the refrigerant fluid circuit and the third heat exchanger in order to be cooled, to a second mode of operation in which only the third heat exchanger is used for cooling the first fluid.

In some embodiments, the air comes from a secondary stream flow passage of the turbomachine.

In some embodiments, at least one of the first and third heat exchangers is configured to be arranged in said secondary stream flow passage of the turbomachine.

In some embodiments, at least one of the elements selected from the second heat exchanger, the expander, and the compressor is configured to be arranged in a nacelle of the turbomachine.

In some embodiments, the cooling system is used for cooling the oil of a circuit in a turbomachine.

The invention also provides a turbomachine including an oil circuit and a cooling system of the present invention, the cooling system being configured to dissipate heat power generated by the oil of the oil circuit.

In some embodiments, the turbomachine is configured to be fitted to an airplane and the actuator means of the cooling system are configured to interrupt the operation of the refrigerant fluid circuit while the airplane is in a cruising type stage of flight.

In some embodiments, the actuator means of the cooling system are configured to actuate the refrigerant fluid circuit when the power of the turbomachine is greater than a predetermined threshold.

The cooling system of the present invention is thus configured to satisfy the needs for cooling the oil circuit of the turbomachine during the various stages of flight of the airplane fitted therewith.

Thus, the third heat exchanger of the cooling system is of dimensions such that, during cruising flight of the airplane, the third heat exchanger on its own dissipates the heat of the oil in the circuit; insofar as cruising flight represents a significant length of time compared with other stages of flight, with cruising flight generally being the longest portion of a flight, the energy savings obtained by not calling on the refrigerant fluid circuit are significant.

During stages of flight in which the power of the turbomachine is above a predetermined threshold, and in particular when the power of the turbomachine is above the power of the turbomachine during cruising flight, e.g. during takeoff or while the airplane is climbing, the refrigerant fluid circuit is used in combination with the third heat exchanger in order to cool the oil of the oil circuit. During these stages, in conventional manner, the refrigerant fluid is heated and vaporized by the evaporator using heat taken from the oil of the oil circuit, and it is then compressed at high temperature and high pressure by the compressor. Thereafter the refrigerant fluid is condensed on contact with air by the condenser in order finally to be expanded on passing through the expander.

BRIEF DESCRIPTION OF THE DRAWING

The invention and its advantages can be better understood on reading the following detailed description of an embodi

DETAILED DESCRIPTION OF EMBODIMENTS

The invention applies to dissipating any type of heat power generated in a turbomachine and that needs to be removed.

The example described below relates more particularly to dissipating the heat power generated by heating the oil of an oil circuit 100 in a turbomachine 200. Nevertheless, the system of the invention could equally well apply in any other gas turbine engine to dissipating heat powers coming from the heating of various electrical components, e.g. batteries or electricity generators.

In known manner, the oil circuit 100 of a turbomachine includes various pieces of equipment 102 that make use of cooling and/or lubricating oil, such as rolling bearings (in particular for turbine and compressor shafts), gearboxes (such as the accessory drive gearbox), electricity generators, etc.

The oil circuit also includes recovery pumps for recirculating oil from the equipment back to an oil tank, feed pumps, and one or more filters.

The turbomachine 200 also has a cooling system 2 of the present invention.

Figure 1:
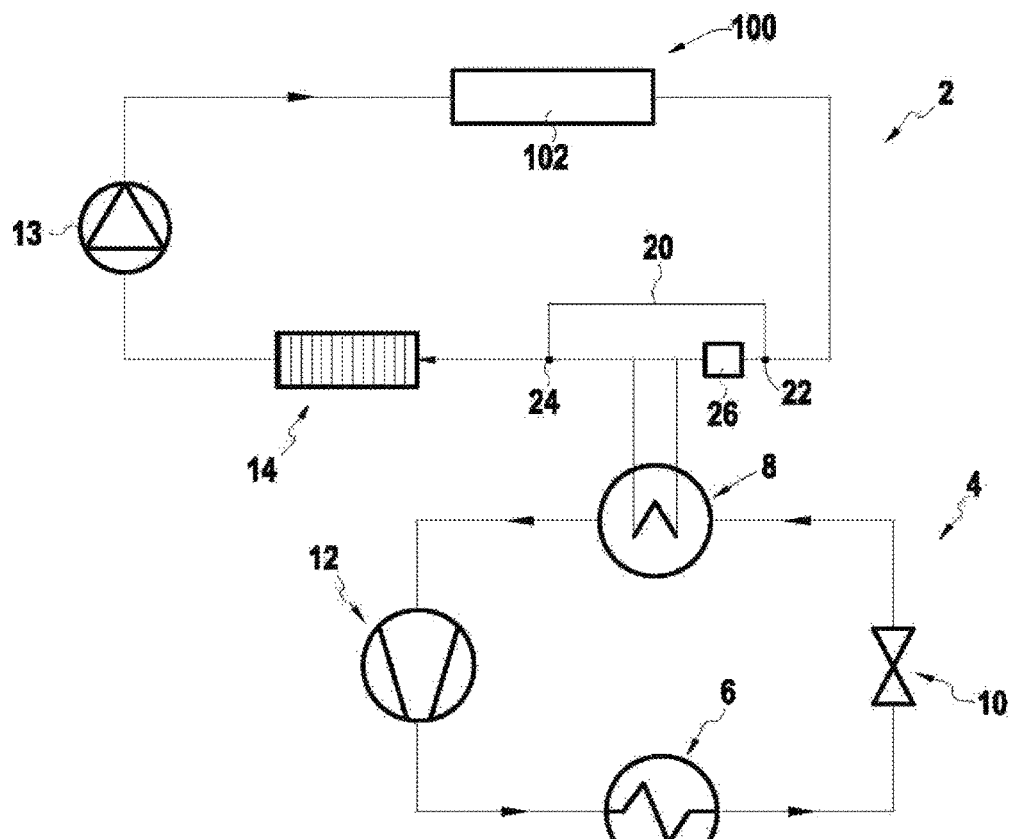
- FIG. 1 is a diagram of a cooling system of the present invention.

As shown in FIG. 1, the cooling system 2 comprises a pump 13 for causing the oil to circulate in the circuit, and a thermodynamic device having a refrigerant fluid circuit 4.

By way of example and in non-limiting manner, the refrigerant fluid of the circuit 4 is in a thermodynamic state below its critical point, however the present invention naturally also covers embodiments in which the refrigerant fluid is in a thermodynamic state above the critical point.

By way of example and in non-limiting manner, the refrigerant fluid circuit 4 has a first heat exchanger 6 that forms a condenser, this first heat exchanger being configured to exchange heat between the refrigerant fluid and air; by way of example and in non-limiting manner, the air is drawn from the secondary stream flow passage of the turbomachine. The first heat exchanger 6 is thus configured to dissipate the heat power from the refrigerant fluid to air.

By way of example and in non-limiting manner, the refrigerant fluid circuit 4 also has a second heat exchanger 8 that forms an evaporator that is configured to exchange heat between the refrigerant fluid and the oil in the oil circuit, by transferring heat from the hot oil in the oil circuit 100 to the refrigerant fluid.

Downstream from the first heat exchanger 6 and upstream from the second heat exchanger 8, taken in the flow direction of the refrigerant fluid, the refrigerant fluid circuit 4 also includes an expander 10.

Downstream from the second heat exchanger 8 and upstream from the first heat exchanger 6, still taken in the flow direction of the refrigerant fluid, the refrigerant fluid circuit 4 also has a compressor 12.

In operation, when it is necessary to cool the oil of the oil circuit 100, the compressor 12 is put into operation. The second heat exchanger 8 forming an evaporator then enables the refrigerant fluid to be evaporated by taking heat from the oil. The compressor 12 serves to increase the pressure and the temperature of the refrigerant fluid in the vapor phase before it passes through the condenser-forming first heat exchanger 6 where it releases heat into air by passing from the gaseous state to the liquid state. The refrigerant fluid, now in the liquid phase, then passes through the expander 10 that has the function of reducing its pressure and lowering its temperature prior to the refrigerant fluid passing once more through the evaporator-forming second heat exchanger 8.

The cooling system 2 of the present invention also has a third heat exchanger 14 of the oil and air type.

By way of example and in non-limiting manner, the air for the third heat exchanger 14 is likewise drawn from the secondary stream flow passage of the turbomachine.

By way of example and in non-limiting manner, the third heat exchanger 14 is located downstream from the refrigerant fluid circuit 4 in the flow direction of oil in the oil circuit 100. This arrangement is particularly advantageous and makes it possible to optimize exchanges of heat between firstly the oil in the oil circuit 100 and secondly the refrigerant fluid in the refrigerant fluid circuit 2 and the air in the third heat exchanger 14, insofar as the temperature difference between the oil and the air is greater than the temperature difference between the oil and the refrigerant fluid.

Nevertheless, without going beyond the ambit of the present invention, it would be possible to devise a cooling system 2 in which the third heat exchanger 14 is located upstream from the refrigerant fluid circuit 4 in the flow direction of oil in the oil circuit 100.

A bypass pipe 20 is also arranged in the oil circuit 100 in parallel with the refrigerant fluid circuit 4, having an inlet 22 arranged between the outlet from the equipment 102 of the oil circuit 100 and the inlet of the evaporating-forming second heat exchanger 8. The pipe also has an outlet 24 arranged between the outlet of the evaporator-forming second heat exchanger 8 and the inlet of the third heat exchanger 14.

Closure means, such as a hydraulic valve 26, for closing the duct going to the inlet of the evaporator-forming second heat exchanger 8 are mounted between the inlet 22 of the bypass pipe 20 and the inlet of the evaporator-forming second heat exchanger 8, said closure means being configured to allow the flow of oil in the oil circuit 100 to pass either through the second heat exchanger 8 of the refrigerant fluid circuit 4 or else through the bypass pipe 20.

The closure means could be mounted in the bypass pipe 20, after its inlet 22, without going beyond the ambit of the present invention.

The cooling system 2 also has actuator means configured to interrupt the operation of the refrigerant fluid circuit 4. By way of example, the actuator means are thus configured to co-operate with the hydraulic valve 26 so that the oil in the oil circuit 100 flows either through the refrigerant fluid circuit 4 in order to be cooled by said refrigerant fluid prior to being cooled by the third heat exchanger 14, or else through the bypass pipe 20 so as to be cooled only by the third heat exchanger 14.

Without going beyond the ambit of the present invention, it is possible to devise a cooling system 2 in which the actuator means are configured to co-operate with the compressor 12 so as to engage or interrupt the operation of the compressor 12, and consequently engage or interrupt the operation of the refrigerant fluid circuit 4. In this embodiment, it would then no longer be necessary to provide a bypass pipe 20 configured to enable the oil of the circuit to be cooled solely by the third heat exchanger 14: the oil of the oil circuit 100, then flowing through the refrigerant fluid circuit 4 while the operation of its compressor 12 is interrupted, would then no longer be cooled by said refrigerant fluid.

Figure 2:
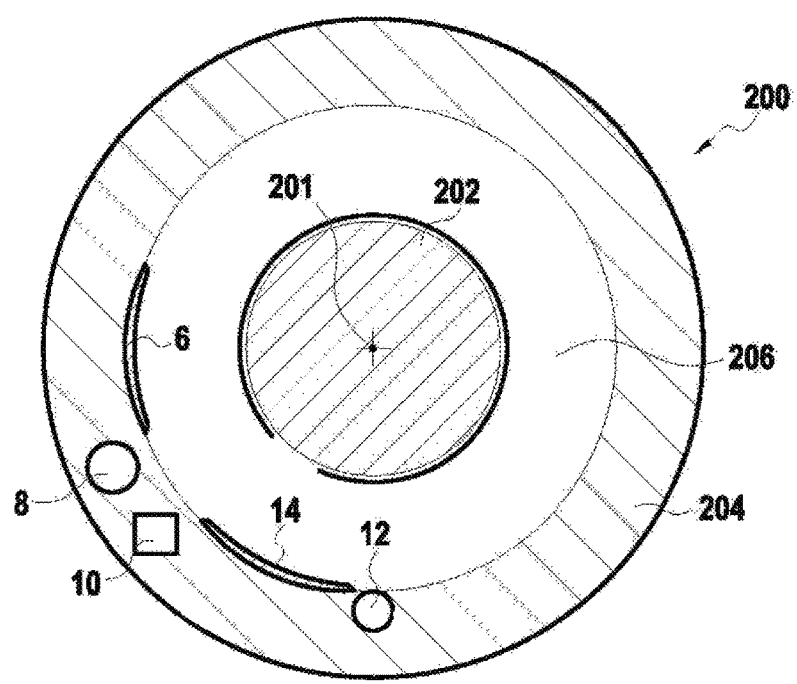
FIG. 2 is a diagrammatic cross-section view of a turbomachine showing the locations of the elements of the FIG. 1 cooling system.

FIG. 2 is a diagrammatic cross-section view showing the turbomachine 200 having the oil circuit 100 and the cooling system 2 of the present invention, the section being taken on a plane extending transversely relative to the longitudinal axis 201 of the turbomachine 200.

The turbomachine 200 includes a gas generator 202 and a nacelle 204, both of which are centered on the longitudinal axis 201 of the turbomachine 200, with an annular passage 206 for passing the secondary flow, which is defined between the nacelle 204 and the gas generator 202.

By way of example and in non-limiting manner, the air used by the cooling system 2 of the present invention, in particular by the condenser-forming first heat exchanger 6 and by the third heat exchanger 14, is air coming from the secondary stream flow passage 206 of the turbomachine 200. For this purpose, the first and third heat exchangers 6 and 14 of the cooling system 2 are positioned in the secondary stream flow passage 206, e.g. against an inside surface of the nacelle 204.

In order to limit head losses in the secondary stream flow passage 206 caused by the presence of the first heat exchanger 6 while the operation of the refrigerant fluid circuit 4 is interrupted, e.g. while the airplane having the turbomachine 200 is in a cruising type stage of flight, it is possible to provide for the presence of movable cover means that are configured either to cover the first heat exchanger 6 when operation of the refrigerant fluid circuit 4 is interrupted, or else to expose the first heat exchanger 6 when the refrigerant fluid circuit 4 is in action.

By way of example, the above-described actuator means that are configured to co-operate with the hydraulic valve 26 may, by way of example and in non-limiting manner, be configured to co-operate with said movable cover means.

By way of example and in non-limiting manner, the second heat exchanger 8, the expander 10, and the compressor 12 are positioned directly on the nacelle 204.

The third heat exchanger 14 is thus of dimensions suitable for enabling it to dissipate the heat from the oil of the oil circuit 100 while the airplane fitted with the turbomachine 100 is in a stage of cruising, without there being any need to use the refrigerant fluid circuit 4. Above the power needed during such a cruising stage, the heat pump constituted by the refrigerant fluid circuit 4 is used in order to limit the size of the third heat exchanger 14 and thus limit the head losses induced by the third heat exchanger 14 in the secondary stream flow passage 206.

Although the present invention is described with reference to specific embodiments, it is clear that modifications and changes may be carried out on those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed, singly or in combination, to a device, and vice versa, all of the characteristics described with reference to a device can be transposed, singly or in combination, to a method.

The invention claimed is:

1. A cooling system for cooling a circuit of a first fluid of a turbomachine, the cooling system including a refrigerant fluid circuit comprising:
 a first heat exchanger configured to exchange heat between the refrigerant fluid and air;
 a second heat exchanger configured to exchange heat between the refrigerant fluid and the first fluid, the first fluid comprising oil;
 an expander located downstream from the first heat exchanger and upstream from the second heat exchanger in the flow direction of the refrigerant fluid; and
 a compressor located downstream from the second heat exchanger and upstream from the first heat exchanger;
 wherein the cooling system further comprises a third heat exchanger of the first fluid and air type.

2. The cooling system according to claim 1, wherein the third heat exchanger is located downstream from the refrigerant fluid circuit in the flow direction of the first fluid in the circuit.

3. The cooling system according to claim 1, wherein it further comprises actuator means configured to interrupt the operation of the refrigerant fluid circuit.

4. The cooling system according to claim 1, wherein the air comes from a secondary stream flow passage of the turbomachine.

5. The cooling system according to claim 4, wherein at least one of the first and third heat exchangers is configured to be arranged in said secondary stream flow passage of the turbomachine.

6. The cooling system according to claim 1, wherein at least one of the elements selected from the second heat exchanger, the expander, and the compressor is configured to be arranged in a nacelle of the turbomachine.

7. A turbomachine including an oil circuit and a cooling system according to claim 1, wherein the cooling system is configured to dissipate heat power generated by the oil of the oil circuit.

8. The turbomachine according to claim 7, further comprising actuator means configured to interrupt the operation of the refrigerant fluid circuit, wherein the turbomachine is configured for fitting to an airplane, and wherein the actuator means is configured to interrupt the operation of the refrigerant fluid circuit while the airplane is in a cruising type stage of flight.

9. The turbomachine according to claim 7, further comprising actuator means configured to interrupt the operation of the refrigerant fluid circuit, wherein the turbomachine is configured for fitting to an airplane, and wherein the actuator means is configured to actuate the refrigerant fluid circuit when the power of the turbomachine is greater than a predetermined threshold.

\* \* \* \* \*